(12) United States Patent
Wallaker

(10) Patent No.: US 7,097,082 B2
(45) Date of Patent: Aug. 29, 2006

(54) MOUNTING APPARATUS

(76) Inventor: Keith David Wallaker, 988 Rickett Rd., Brighton, MI (US) 48116

( * ) Notice: Subject to any disclaimer, the term of this patent is extended or adjusted under 35 U.S.C. 154(b) by 152 days.

(21) Appl. No.: 10/331,210

(22) Filed: Dec. 30, 2002

(65) Prior Publication Data

US 2004/0124317 A1    Jul. 1, 2004

(51) Int. Cl.
*B60R 7/06* (2006.01)
(52) U.S. Cl. .................. 224/483; 224/545; 224/546; 224/557; 224/929; 296/37.12; 296/37.5
(58) Field of Classification Search ............ 224/545, 224/546, 557, 564, 565, 483, 282, 929; 296/37.12, 296/37.13, 37.5
See application file for complete search history.

(56) References Cited

U.S. PATENT DOCUMENTS

| | | | |
|---|---|---|---|
| 3,606,447 A | 9/1971 | Ryding | |
| 3,964,612 A * | 6/1976 | Skilliter et al. | 211/26 |
| 4,223,754 A | 9/1980 | Mizuno et al. | |
| 4,619,386 A | 10/1986 | Richardson | |
| 4,687,167 A * | 8/1987 | Skalka et al. | 248/126 |
| 4,818,010 A | 4/1989 | Dillon | |
| 4,846,382 A | 7/1989 | Foultner et al. | |
| 4,880,270 A * | 11/1989 | Cooper | 297/188.21 |
| 4,998,704 A * | 3/1991 | Tarlow et al. | 248/447.1 |
| 5,102,181 A | 4/1992 | Pinkney | |
| 5,555,491 A * | 9/1996 | Tao | 361/686 |
| 5,751,548 A * | 5/1998 | Hall et al. | 361/686 |
| 5,859,762 A * | 1/1999 | Clark et al. | 361/686 |
| 5,915,776 A | 6/1999 | Bieri | |
| 6,067,078 A * | 5/2000 | Hartman | 345/168 |
| 6,113,047 A * | 9/2000 | Wung et al. | 248/284.1 |
| 6,208,505 B1 * | 3/2001 | Kuchta et al. | 361/683 |
| D453,318 S | 2/2002 | Moore | |
| 6,386,413 B1 * | 5/2002 | Twyford | 224/553 |
| 6,428,072 B1 | 8/2002 | Moore | |
| 6,739,654 B1 * | 5/2004 | Shen et al. | 297/188.04 |
| 2001/0042812 A1 | 11/2001 | Perzewski | |

OTHER PUBLICATIONS

*Police and Security News*, vol. 18, Issue 1, p. 4, Jan./Feb. 2002; published by Days Communication, Inc., 1690 Quarry Road, Kulpsville, PA 19443.

*Law and Order*, vol. 50, No. 7k, p. 135, Jul. 2002; published by Hendon Publishing Company, 130 Waukegan Road, Deerfield, IL 60015.

* cited by examiner

Primary Examiner—Stephen K. Cronin

(57) ABSTRACT

A mounting apparatus (20) for mounting accessory components to a panel includes a frame assembly (22) configured to attach to at least one location on a panel (58). The frame assembly (22) may include a frame member (26) and a first mounting plate (28) pivotally attached to the frame member (26). The first mounting plate (28) is configured to receive a component and is moveable from a closed position and an open position at an angle relative to the frame member (26). The frame member (26) further includes at least one aperture (56) to provide access to features and controls located on the panel (58) positioned behind the apparatus (20).

8 Claims, 10 Drawing Sheets

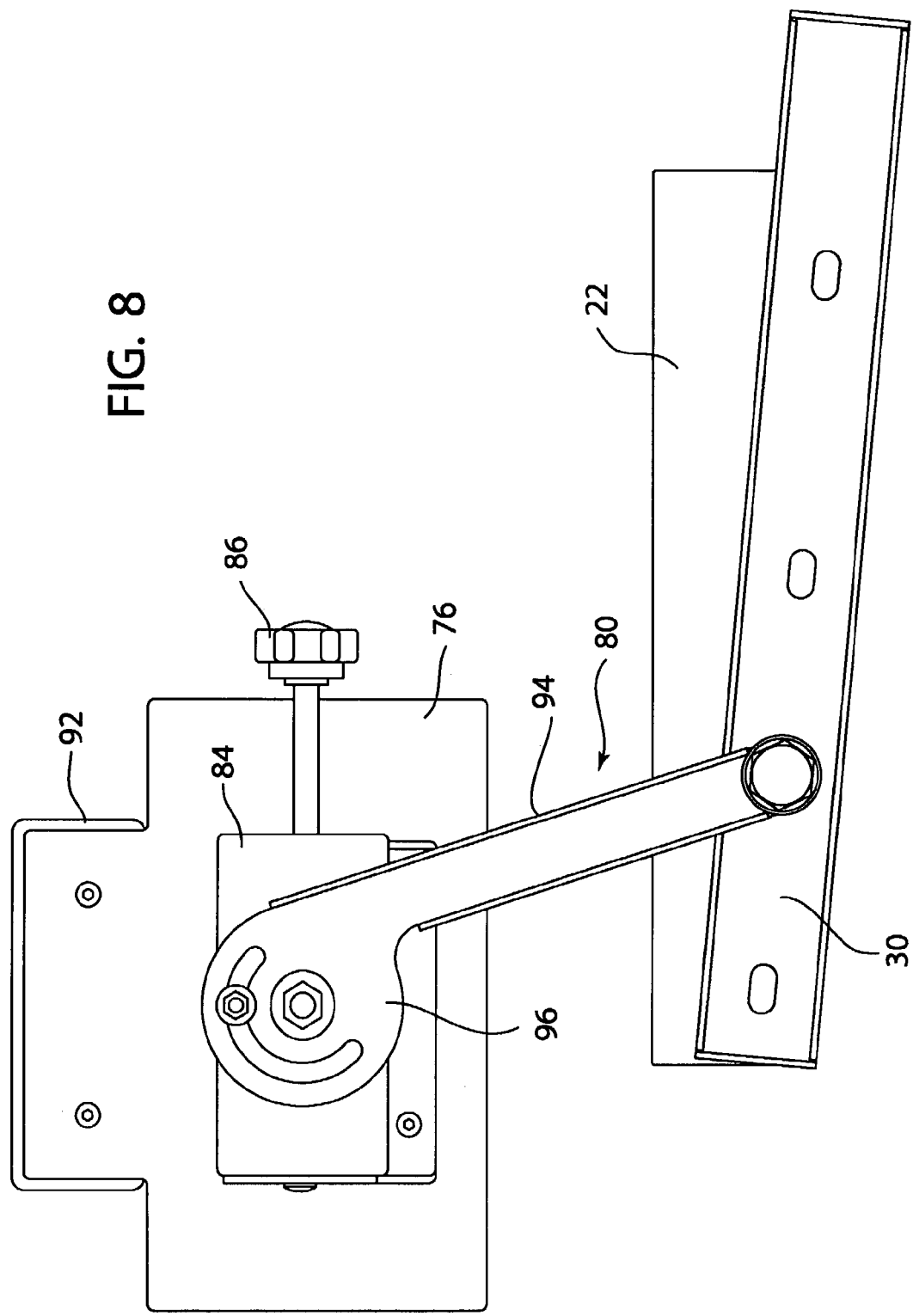

MOUNTING APPARATUS

BACKGROUND OF THE INVENTION

1. Field of the Invention

The present invention generally relates to an apparatus to mount accessory components and particularly to an apparatus to mount accessory components to a vehicle instrument panel.

2. Discussion of the Prior Art

Mounting systems for attaching accessories to a vehicle dash are generally known in the art. Several styles and types of mounts are capable of securing a variety of accessories to a vehicle such as notepads, computers, file folders, mirrors, lights, and fans. Such mounts can be suited for use by law enforcement vehicles. Most of these mounting devices attach to the instrument panel within a vehicle in a location convenient for the driver. Unfortunately, they also block access to existing vehicle functions and features also located within the vehicle instrument panel such as the radio, HVAC controls and the like. This blocked access frequently requires extensive and expensive relocation of these controls. Thus, there is a desire and a need in the art to provide an economical mount, suitable for a vehicle, that not only allows convenient access to the additionally mounted accessories, but also allows access to all pre-existing vehicle controls without the need for extensive vehicle modifications.

SUMMARY OF THE INVENTION

Accordingly, the present invention provides an accessory mounting apparatus for mounting components to a panel that provides convenient accessibility to the user while at the same time enables the user to access existing functions and features that are built in to the panel.

One embodiment of the present invention provides an accessory mounting apparatus for mounting a component to a panel and includes a frame assembly configured to be attached to at least one location on the panel and includes a frame member and a first mounting plate pivotally attached to the frame member. In this embodiment, the first mounting plate is configured to receive the component and is moveable between a closed position and an open position.

Another embodiment of the present invention provides an apparatus for mounting a component within an interior of a vehicle having an instrument panel. This embodiment includes a first support bracket configured to be connected to the instrument panel and has at least one side support bracket configured to be attached to the instrument panel and a frame assembly is connected to the first support bracket at a first location and connected to the at least one side support bracket at a second location. The frame assembly includes a frame member and a first mounting plate pivotally connected to the frame member and the first mounting plate is moveable between an open position and a closed position.

Other features of the present invention will become more apparent to persons having ordinary skill in the art to which the present invention pertains from the following description and claims taken in conjunction with the accompanying figures.

BRIEF DESCRIPTION OF THE FIGURES

The foregoing features, as well as other features, will become apparent with reference to the description and figures below, in which like numerals represent like elements, and in which:

FIG. 8 is a bottom view of an embodiment of the extension bracket assembly of the present invention shown connected to an embodiment of the frame assembly;

DETAILED DESCRIPTION OF THE INVENTION

The present invention generally relates to an apparatus to mount accessory components and particularly to an apparatus to mount accessory components to a vehicle instrument panel. The present invention allows convenient component access to the user while also enabling access to existing vehicle functions and features built into the vehicle instrument panel.

Figure 1:
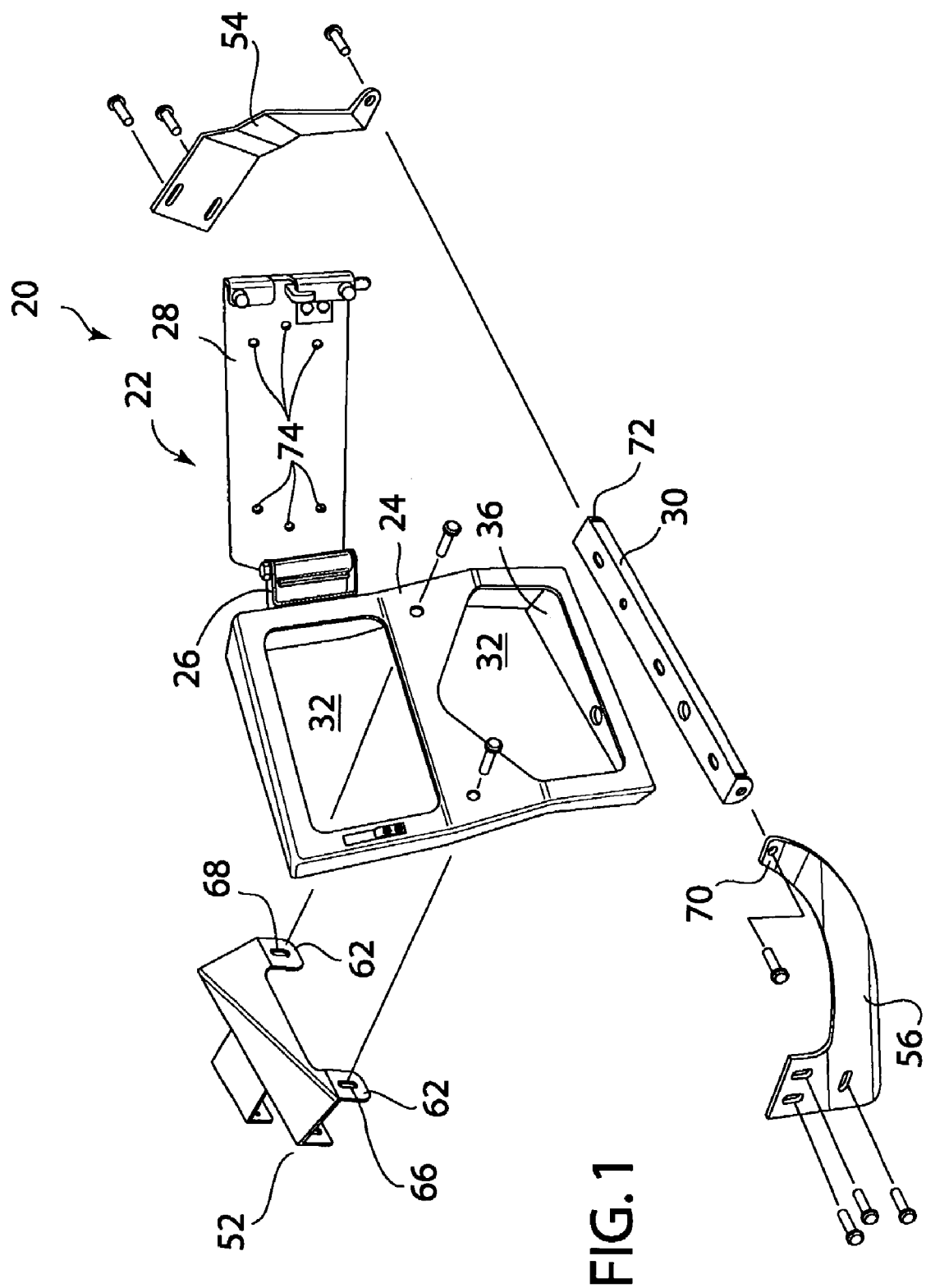
FIG. 1 is an exploded perspective view of an embodiment of the present invention.
Figure 2:
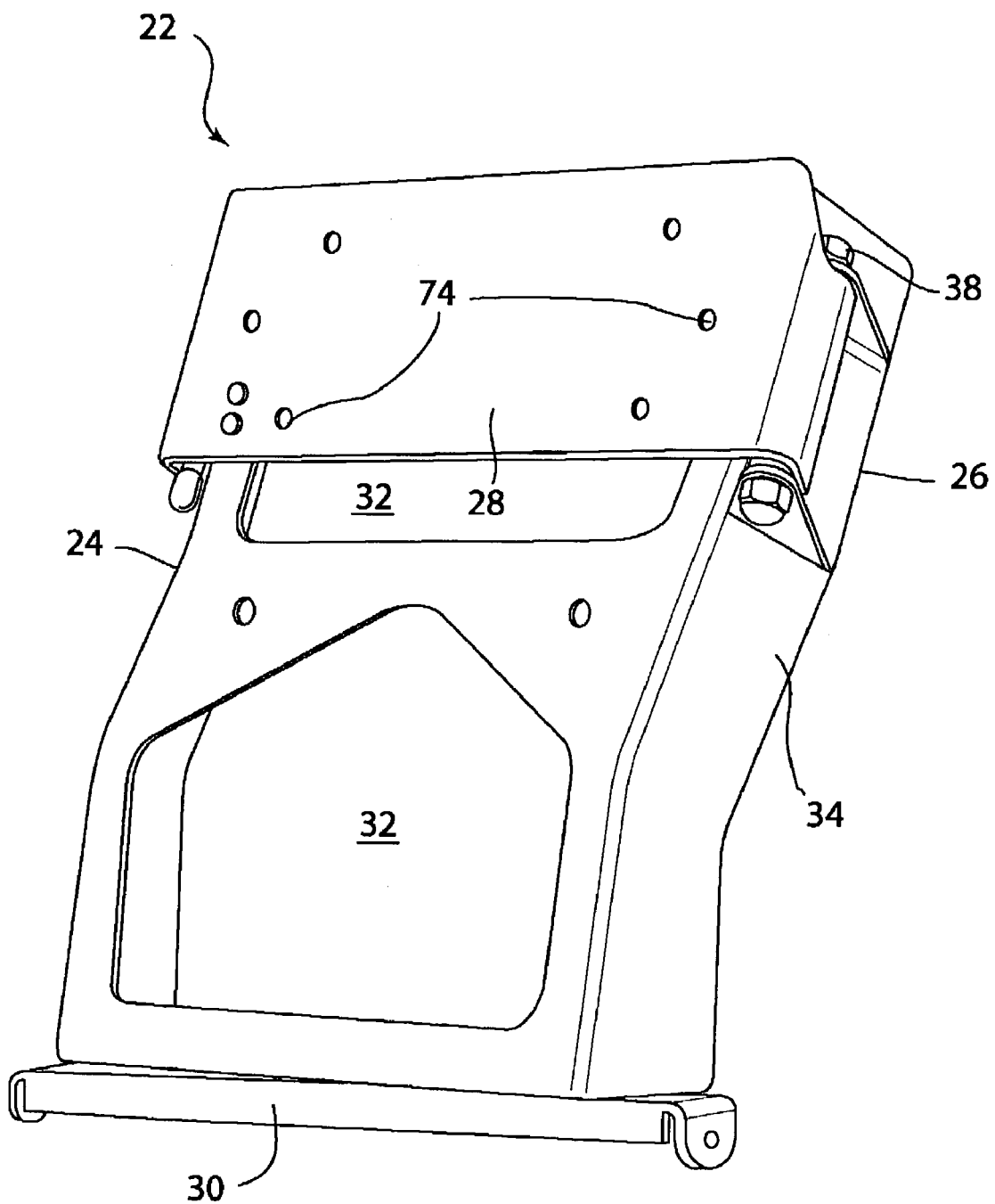
FIG. 2 is a perspective view of an embodiment of a frame assembly of the present invention.
Figure 3:
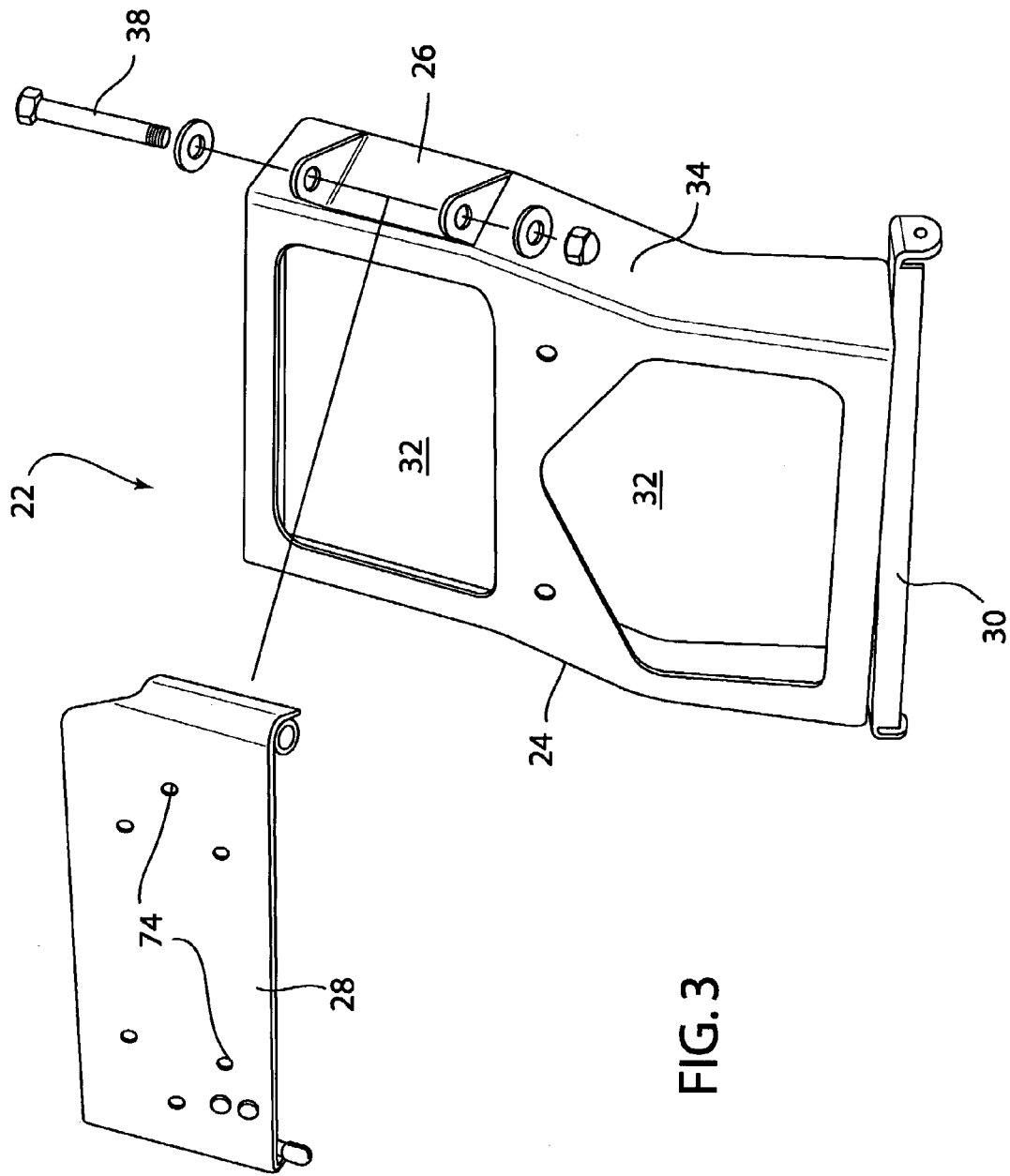
FIG. 3 is an exploded perspective view of the frame assembly shown in FIG. 2.
Figure 9:
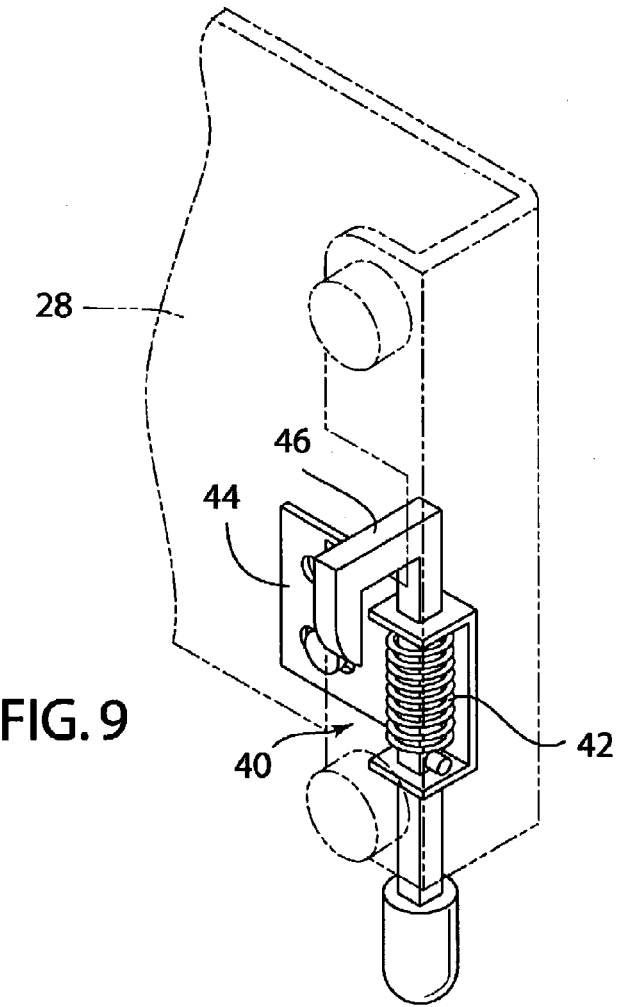
FIG. 9 is a perspective view of an embodiment of a lock mechanism of the present invention.

Referring to FIGS. 1–4, in one embodiment of the present invention a mounting apparatus 20 includes a frame assembly 22 having a frame member 24, a yoke 26, a first mounting plate 28 and a center bracket 30. The embodiment as shown, and not by way of limitation, is suited for mounting within a law enforcement vehicle. It allows access to existing instrument panel controls while also allowing convenient access to the mounted accessory components such as those used in a law enforcement application. Such components may include notepads, computers, and the like. The frame member 24 may include at least one aperture 32 to provide access to existing vehicle controls and functions that otherwise may become concealed or inaccessible behind the first mounting plate 28 (to be discussed in more detail later). As shown in FIGS. 2 and 3, yoke 26 can be attached to frame member 24 on a side portion 34 of frame member 24 by welding, or alternatively, by other suitable attachment methods known in the art. Center bracket 30 may likewise be welded (shown), bolted or connected by other suitable attachment methods to frame member 24 at a bottom portion 36 of frame member 24. As shown in this embodiment, first mounting plate 28 is pivotally connected to yoke 26 with a pivot pin 38. First mounting plate 28 could also be pivotally mounted directly to frame member 24 without yoke 26 utilizing other pivotal attachment methods. This allows first mounting plate 28 to move from a closed position where it may be substantially parallel to frame member 24 to an open position where it may be positioned at a desired angle relative to frame member 24. First mounting plate 28 is also configured to receive a component, such as a notepad or computer screen, for use by a user in the vehicle by the inclusion of at least one mounting hole 74. First mounting plate 28 may include a latch mechanism 40 to allow a user to releasably secure first mounting plate 28 in the closed position. For example, a latch mechanism 40 as illustrated in FIG. 9 includes a spring 42, a latch bracket 44, and a latch hook 46. Latch hook 46 is slidably received within a flange 48 on first mounting plate 28. Latch hook 46 can then be moved up and down by the user to connect it with a latch connector 50 on frame member 24 to hold first mounting plate 28 in the closed position. Latch mechanism 40 may be attached to first mounting plate 28 with bolts as shown or other suitable attachment methods.

Figure 4:
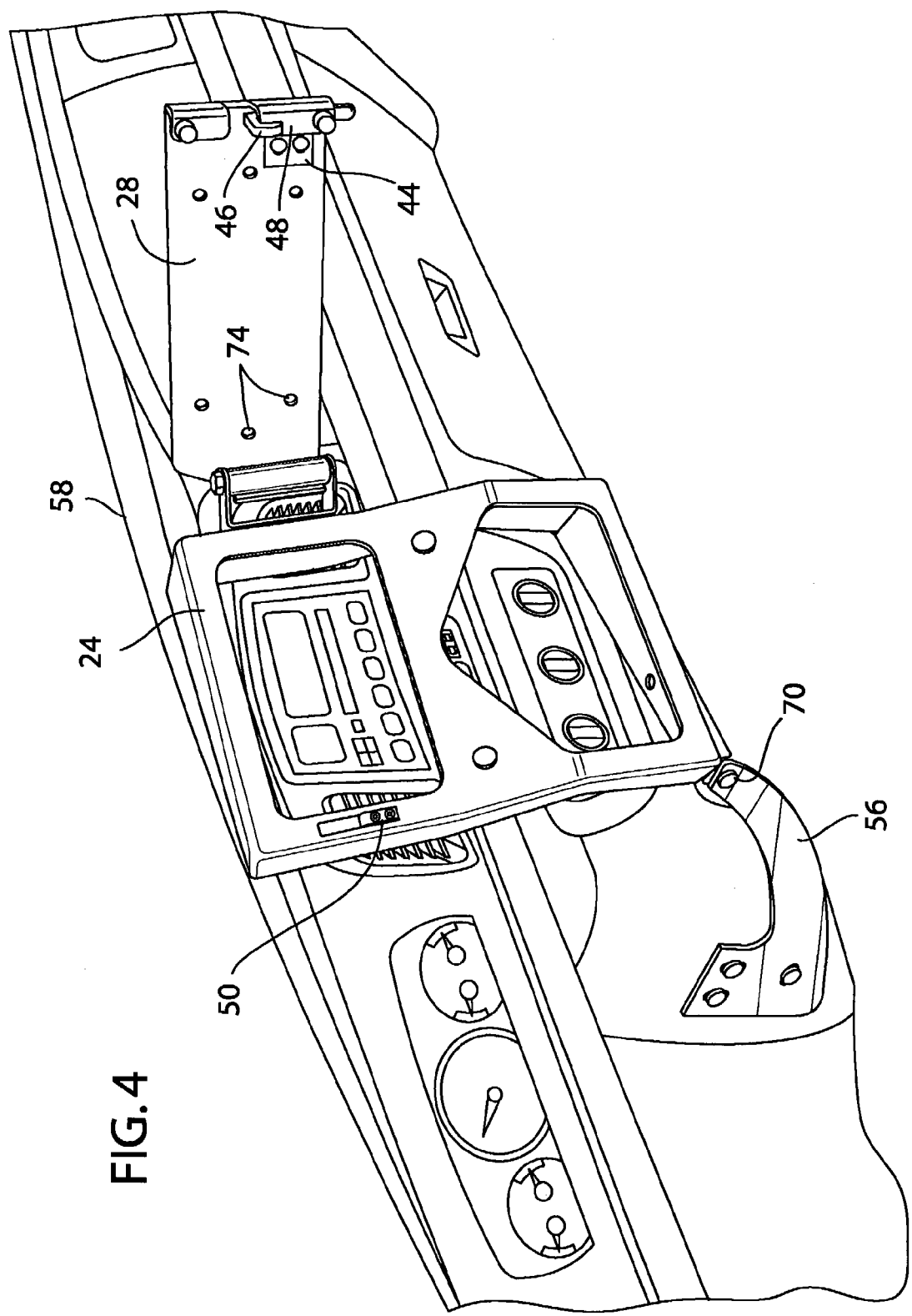
FIG. 4 is a perspective view of an embodiment of the present invention installed in a vehicle.
Figure 5:
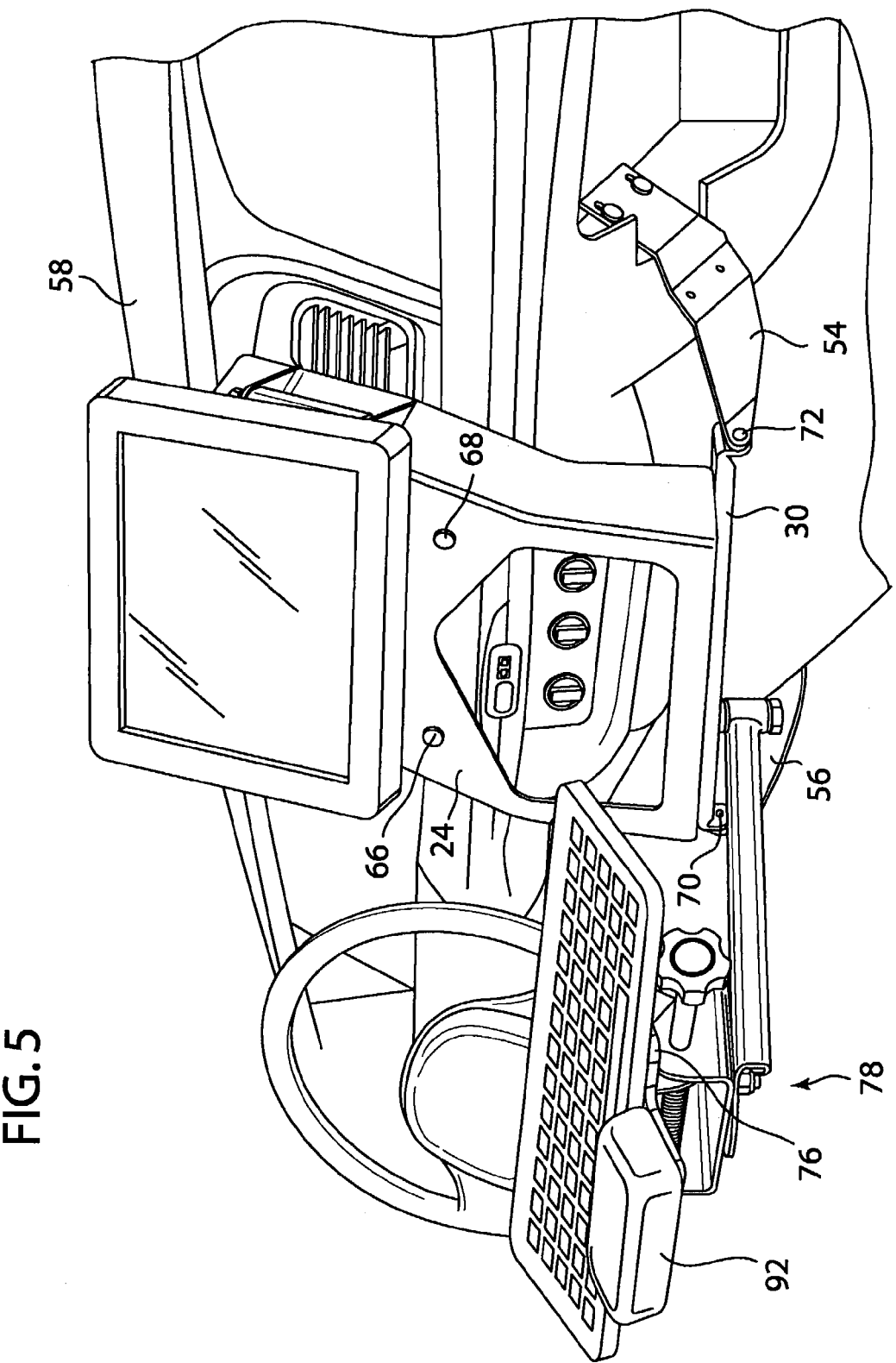
FIG. 5 is a perspective view of an embodiment of the present invention installed in a vehicle.
Figure 6:
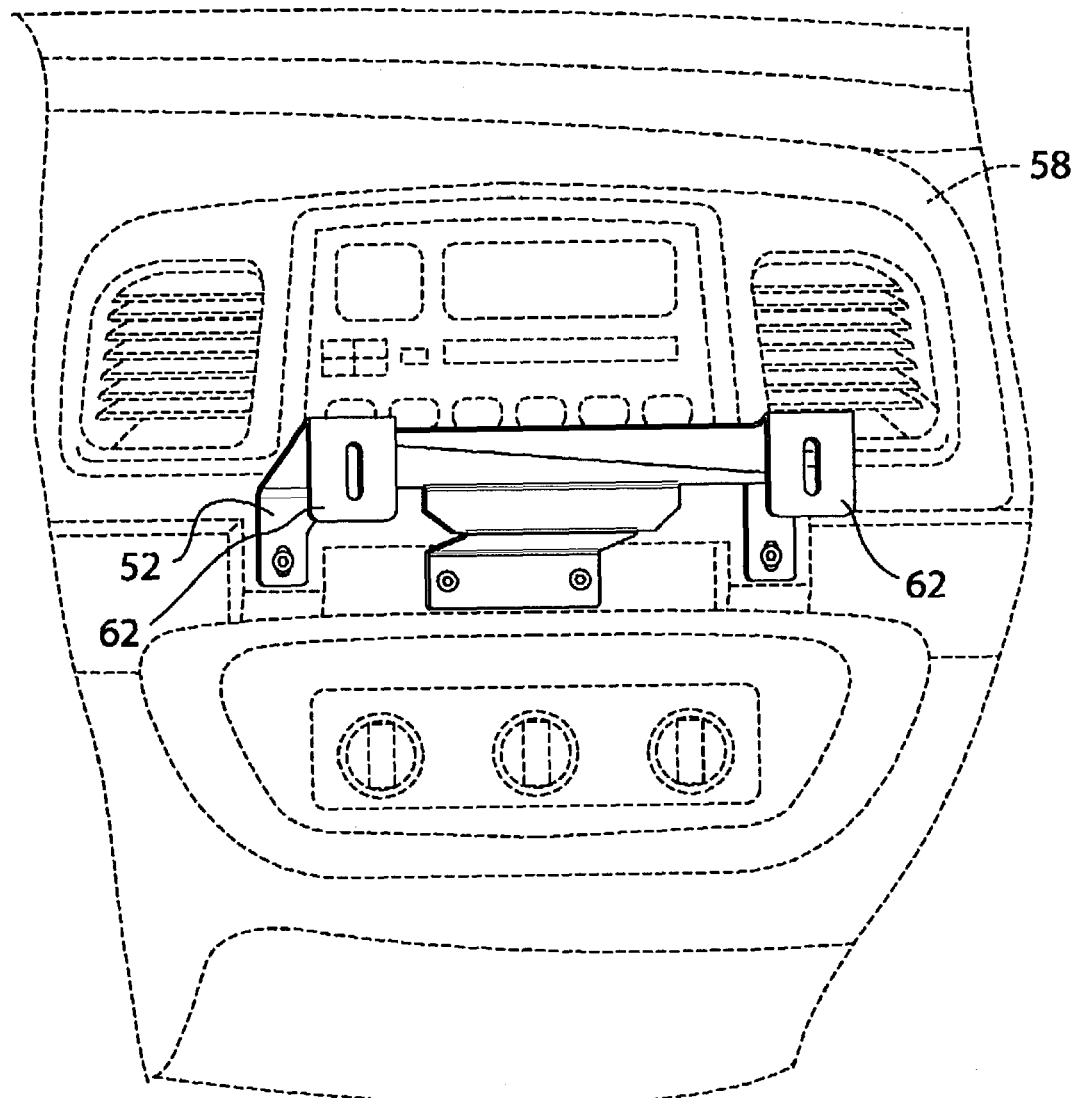
FIG. 6 is a front view of an embodiment of the first support bracket of the present invention installed in a vehicle.

Mounting apparatus 20 includes means to attach to an instrument panel such as a vertical vehicla instrument panel (also known as a "dashboard" as shown in FIG. 4). The attachment means may include integral bracket members with mounting points specific to a particular instrument panel. Alternatively, as shown in FIGS. 1, 4, 5 and 6, mounting apparatus 20 may be attached to a panel 58, such as a vehicle instrument panel, by connecting it to an attachable first support bracket 52 and to first and second side supports 54 end 56. Allowing attachment of support brackets to the mounting apparatus 20 allows for a variety of instrument panel applications without the need to retool the entire apparatus for each application. As shown, only the support brackets would need reconfiguration for different applications. Thus, first support bracket 52 and first and second side supports 54 and 56 may be mounted to the desired panel 58. Referring to FIG. 6, first support bracket 52 includes mounting flanges 62 that provide a mounting surface for frame assembly 22. As shown in FIGS. 1, 5 and 6, frame assembly 22 may be connected with screws to mounting arms 62 at upper mounting locations 66 and 613 and to first and second side support brackets 54 and 56 also with screws at lower mounting locations 70 and 72.

Figure 7:
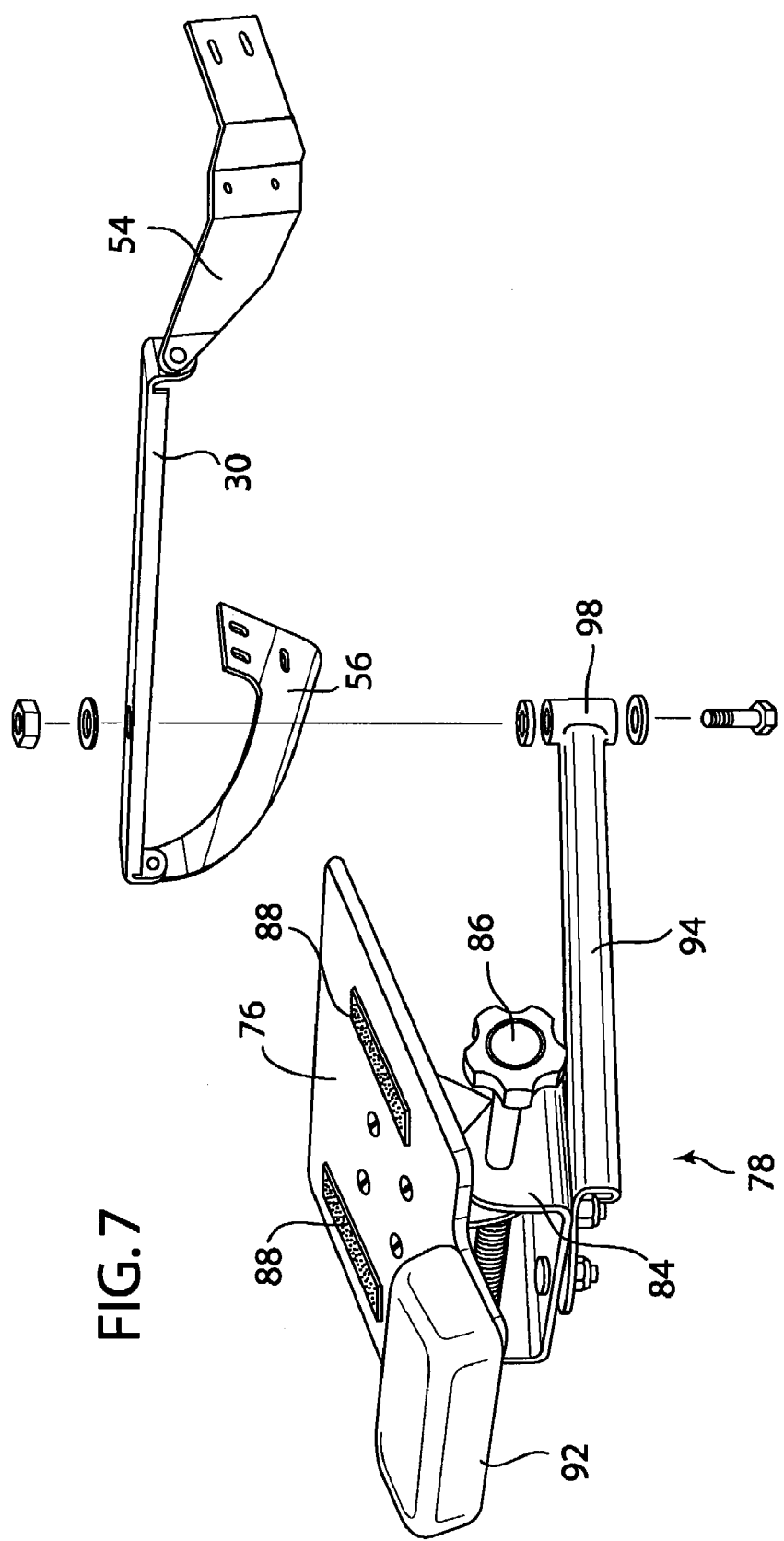
FIG. 7 is an exploded perspective view of an embodiment of the extension bracket assembly of the present invention.

A user may mount a variety of accessory components on first mounting plate 28 such as a notepad or computer screen. First mounting plate 28 may include at least one mounting hole 74 for use to secure various components to it with fasteners such as screws or clips. Other attachment methods could also be used such as VELCRO attachments, adhesives or any other suitable attachment method. When first mounting plate 28 is in the closed position (as shown in FIGS. 2 and 5), it is in a relatively convenient location for the user to access. Controls located on panel 58, such as vehicle controls on a vehicle instrument panel 58, may be substantially concealed when first mounting plate 28 is in this closed position. The pivotal attachment of first mounting plate 28 overcomes this problem and allows pivoting of the mounting plate 28 to an open position where it allows user access to panel 58 controls. Thus, as shown in FIGS. 4 and 5 for a vehicle application, when first mounting plate 28 is in the open position it allows access to items such as vehicle functions and controls that are positioned on the instrument panel 58 through apertures 32 on frame member 24. These features and controls would otherwise be covered by the mounting apparatus 20 and be inaccessible when mounting apparatus 20 is installed. Referring to FIGS. 5,7 and 8, an optional extension bracket assembly 78 may be connected to the panel 58 or to frame assembly 22 as shown in FIG. 5. Extension bracket assembly 78 may include an arm 80, a clevis assembly 84, a second mounting plate 76 and an armpad 92. Second mounting plate 76 may provide the user with an additional mounting surface to add a second component such as a computer keyboard. Similar to first mounting plate 28, second mounting plate 76 may include VELCRO pads 88 to secure various components to it such as a computer keyboard or alternatively second mounting plate 76 may include holes to secure a component to it with fasteners such as screws or clips. As shown, and not by way of limitation, arm 80 includes a brace portion 94 having a radiused end 96 and a connecting tube 98 used to threadably connect extension bracket assembly 78 to center bracket 30. Radiused end 96 is connected to clevis assembly 84 with bolts or may be attached by rivets, welding or other suitable attachment method. Clevis assembly 84 shown in the figures is a standard off-the-shelf assembly available in the art and includes a disc 82 (not visible in the figures). Disc 82 is sandwiched between radiused end 96 and clevis assembly 84, and may be made from a variety of materials, such as polycarbonate, to reduce surface friction between arm 80 and clevis assembly 84.

Clevis assembly 84 allows extension bracket assembly 78 to rotate laterally and pivot and/or tilt in the fore-aft direction. This pivotal motion allows the user to position the second mounting plate 76 at a desired location. This connection also provides for enough friction to hold second mounting plate 76 and a component such as a keyboard attached thereon, at the desired location, while at the same time providing for enough pivotal movement to allow the user to laterally adjust its location. Once the desired angle is achieved, the user can tighten a rod assembly 86 on clevis assembly 84 to secure the position of extension bracket assembly 78. Second mounting plate 76 can be connected to clevis assembly 84 with bolts or other suitable fasteners and armpad 92 may be attached to second mounting plate 76 by screws or other suitable attachment methods and provides comfort and support to the users hand and arm.

Figure 10:
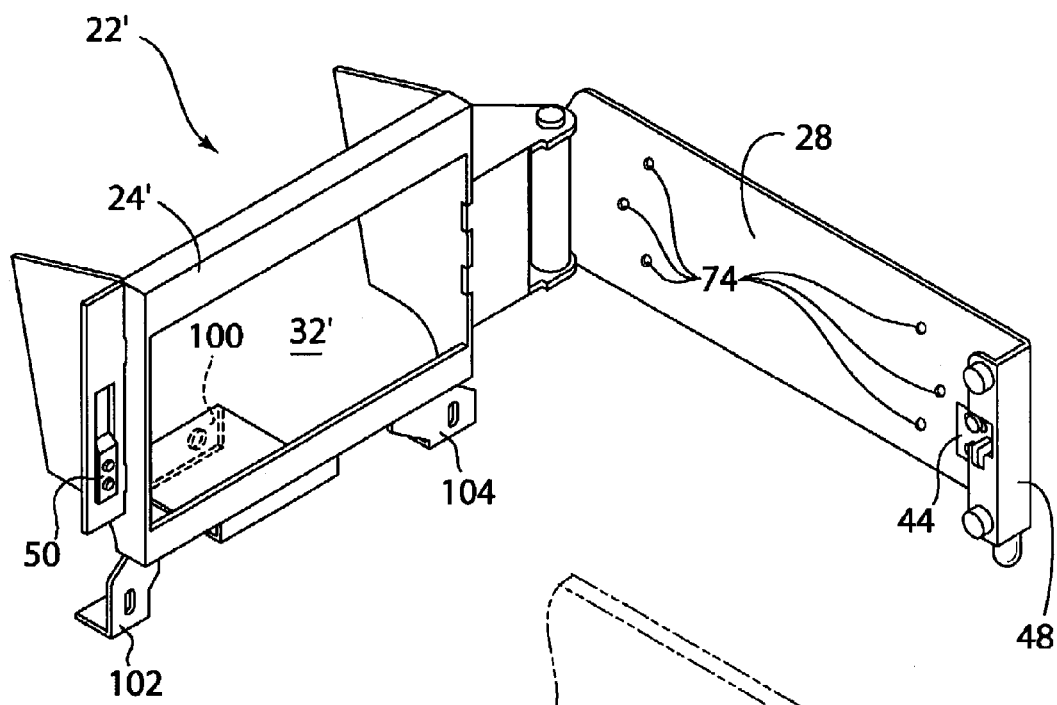
FIG. 10 is a perspective view of an embodiment of the present invention.
Figure 11:
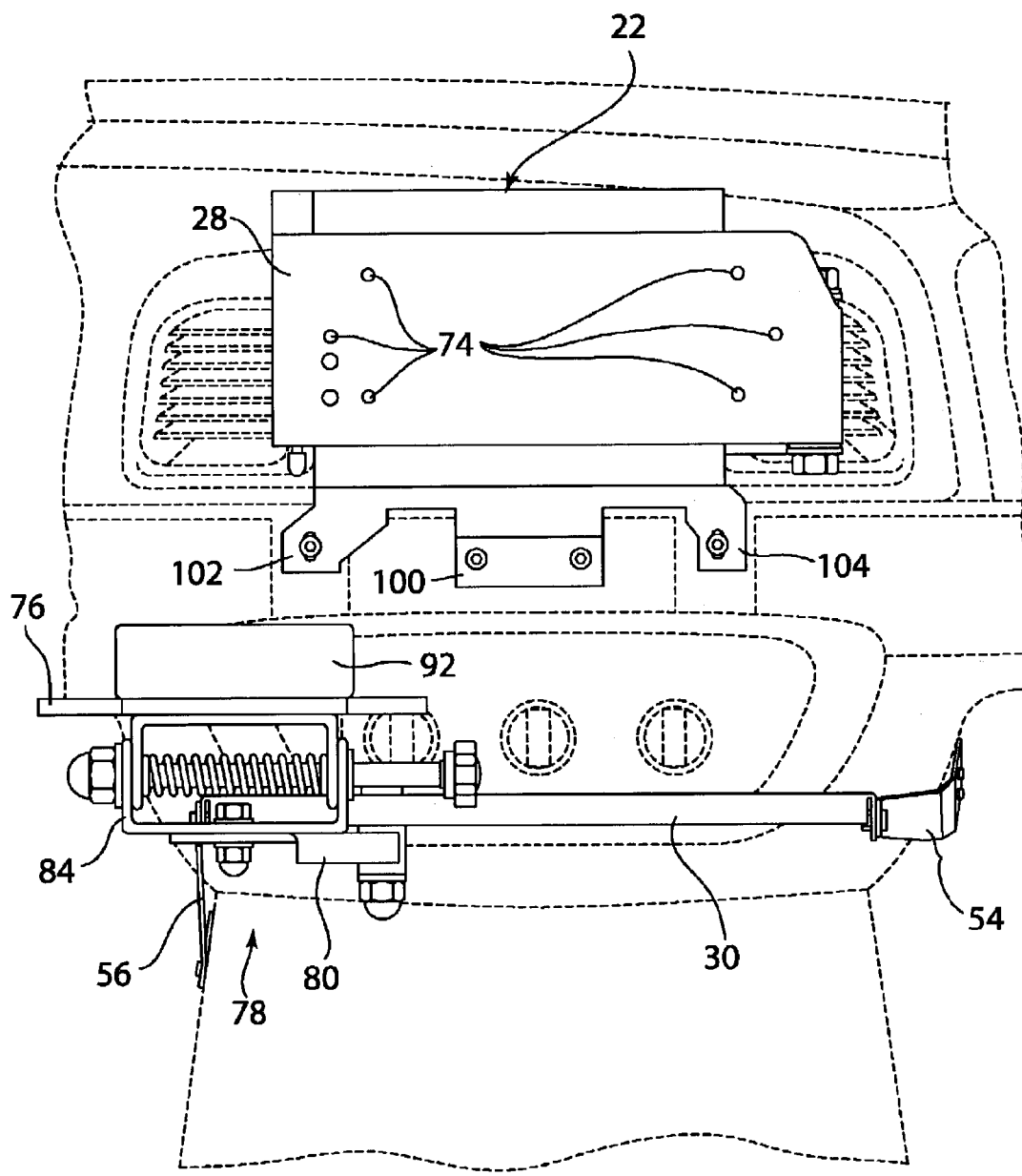
FIG. 11 is a front view of the embodiment of the present invention shown in FIG. 10 installed in a vehicle and an extension bracket assembly of the present invention.

In an alternate embodiment of the present invention illustrated in FIGS. 10 and 11, mounting apparatus 20' may include frame assembly 22' having a frame member 24' and a first mounting plate 28 the same as in the previous embodiment. As shown in FIG. 11, frame assembly 22' may be attached to a panel 58, such as a vehicle instrument panel 58, with screws or other suitable attachment methods. Frame assembly 22' may include a center frame mount 100 and first and second side frame mounts 102 and 104. Frame assembly 22' may also be configured to conform to a particular panel as shown in FIG. 11 to aid in securing it to a panel such as vehicle instrument panel 58. As with frame member 24, frame member 24' may also include one or more apertures 32' to provide access to items such as vehicle controls, that would otherwise be hidden behind mounting apparatus 20'.

As with the previous embodiment, extension bracket assembly 78 may be connected to panel 60, such as vehicle instrument panel 58 as illustrated in FIG. 11. Extension bracket assembly 78 can be attached with center bracket 30 and first and second side supports 54 and 56, as in the previous embodiment. Extension bracket assembly 78 may include second mounting plate 76 to provide the user with a mounting surface to add a second component such as a computer keyboard.

While the invention has been described in conjunction with specific embodiments, it is evident that many alternatives, modifications and variations will be apparent to those skilled in the art in light of the foregoing description. Accordingly, the present invention attempts to embrace all such alternatives, modifications and variations that fall within the spirit and scope of the appended claims.

The invention claimed is:

1. An apparatus for mounting an accessory component to a vertical instrument panel, comprising:
   a frame assembly configured to be attached to at least one location on the vertical instrument panel and including a frame member and a first mounting plate pivotally attached to said frame member, said first mounting plate is configured to receive the component and is moveable between a closed position and an open position, said frame member includes at least one aperture to provide access to items positioned behind the apparatus when said first mounting plate is in said open position, said frame assembly further includes an extension bracket assembly connected to said frame assembly and configured to receive a second component, and said extension bracket assembly is laterally pivotable in relation to said frame assembly.

2. A mounting apparatus as defined in claim 1, wherein said first mounting plate is substantially parallel to said frame member in said closed position and at an angle relative to said frame member in said open position.

3. A mounting apparatus as defined in claim 1, wherein said extension bracket assembly further comprises a clevis assembly, said clevis assembly pivotably attached in a fore-aft direction in relation to said extension bracket.

4. A mounting apparatus as defined in claim 1, further including at least one side support bracket connecting said frame assembly to the panel at a second connection.

5. A mounting apparatus as defined in claim 1, further including a lock mechanism connected to said first mounting plate to releasably secure said first mounting plate in said closed position.

6. An apparatus for mounting an accessory component to a vertical instrument panel, comprising:

a frame assembly configured to be attached to at least one location on the vertical instrument panel and including a frame member and a first mounting plate pivotally attached to said frame member;

wherein said first mounting plate is configured to receive the component and is moveable between a closed position and an open position; and further including a center bracket attached to said frame assembly, a first and second side support bracket, and an extension bracket assembly connected to said center bracket and adopted to receive a second component.

7. A mounting apparatus as defined in claim 6, wherein said extension bracket assembly is laterally pivotable in relation to said frame assembly.

8. A mounting apparatus as defined in claim 6, wherein said extension bracket further comprises a clevis assembly, asid clevis assembly pivotably attached in a fore-aft direction in relation of said extension bracket.

* * * * *